United States Patent [19]
Balko et al.

[11] 3,942,153
[45] Mar. 2, 1976

[54] DOCUMENT TRANSPORT AND SCANNING SYSTEM FOR OPTICAL CHARACTER RECOGNITION

[75] Inventors: Jack E. Balko, Grand Prairie; John E. Blair, Richardson; Jerry L. Bybee; William F. Fuhrmeister, both of Dallas; Richard T. Kushmaul, Irving, all of Tex.

[73] Assignee: Recognition Equipment Incorporated, Irving, Tex.

[22] Filed: Mar. 25, 1974

[21] Appl. No.: 454,268

Related U.S. Application Data
[63] Continuation of Ser. No. 166,736, July 28, 1971, abandoned.

[52] U.S. Cl............ 340/146.3 F; 178/7.6; 271/188; 340/146.3 AH; 340/146.3 H
[51] Int. Cl.² ........................................ G06K 9/04
[58] Field of Search............... 340/146.3 F, 146.3 Z; 178/7.6; 350/6, 7, 99, 285; 250/235, 236; 271/103, 188

[56] References Cited
UNITED STATES PATENTS

| | | | |
|---|---|---|---|
| 2,302,060 | 11/1942 | Ryan | 271/45 |
| 2,816,160 | 12/1957 | Young | 271/45 |
| 3,239,220 | 3/1966 | Lot et al. | 271/75 |
| 3,284,568 | 11/1966 | Cook, Jr. et al. | 340/146.3 F |
| 3,458,688 | 7/1969 | Garry et al. | 340/146.3 H |
| 3,461,298 | 8/1969 | Hagelbarger et al. | 178/7.6 |
| 3,483,511 | 12/1969 | Rabinow | 340/146.3 F |
| 3,618,018 | 11/1971 | Johnston et al. | 340/146.3 AH |
| 3,809,806 | 5/1974 | Walker et al. | 178/7.6 |
| 3,848,087 | 11/1974 | Carrell | 178/7.6 |

*Primary Examiner*—Leo H. Boudreau
*Attorney, Agent, or Firm*—Richards, Harris and Medlock

[57] ABSTRACT

A document transport including an endless belt driven by a pair of logic controlled servo motors which precisely move a document from a feeding station through a scanning station and into a stacking station. As documents are passed through the scanning station, images of the characters thereon are projected by a scanner onto a single columnar retina. The scanner includes a single shaft which is repetitively rotated through a preselected arc by a logic controlled servo motor synchronized with the transport control system. An illumination mirror is mounted on one end of the shaft and an image mirror is mounted on the other so that illumination from a lamp is scanned across the characters to be read while the illuminated images are reflected from the image mirror onto the retina.

15 Claims, 10 Drawing Figures

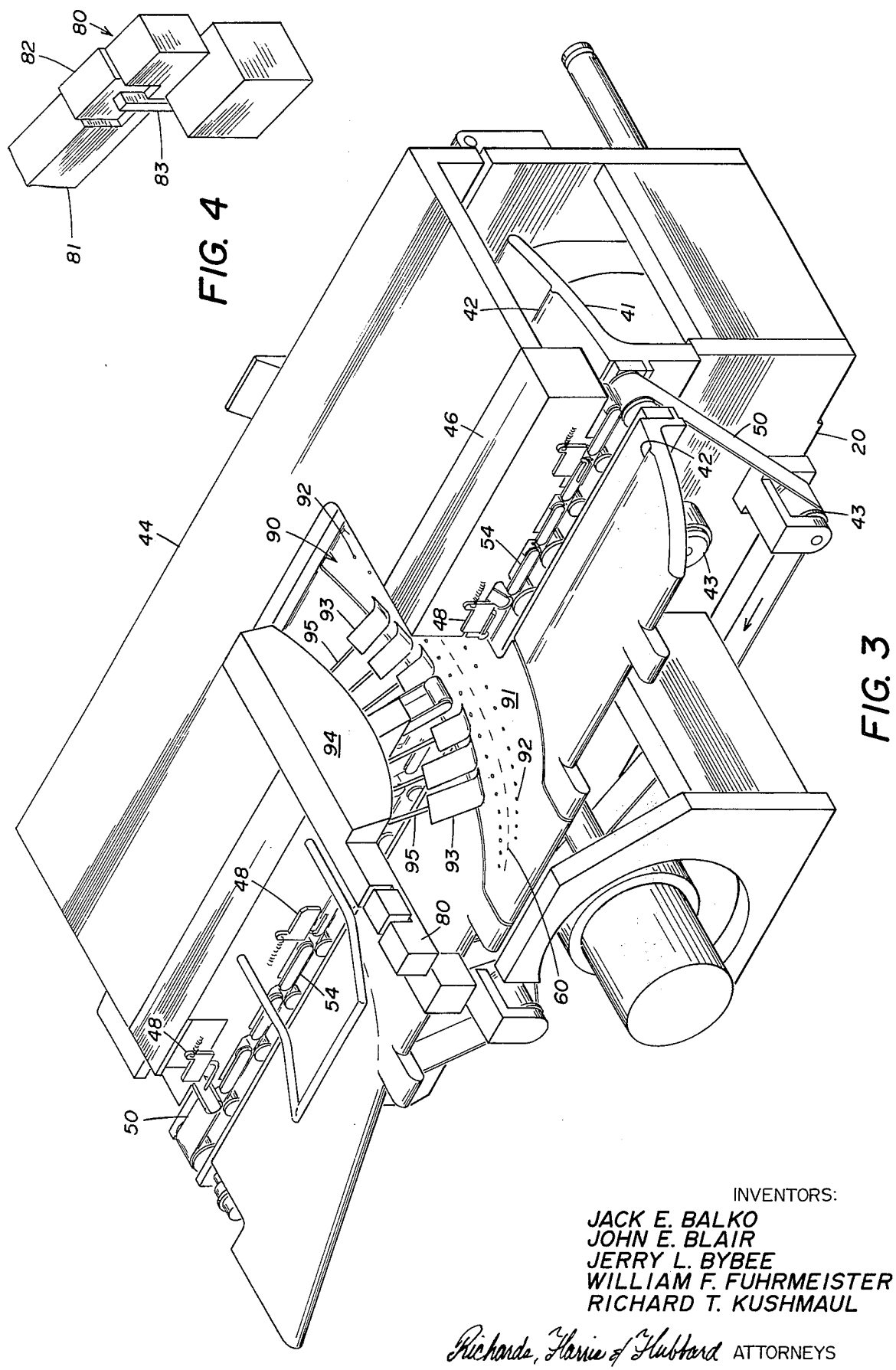

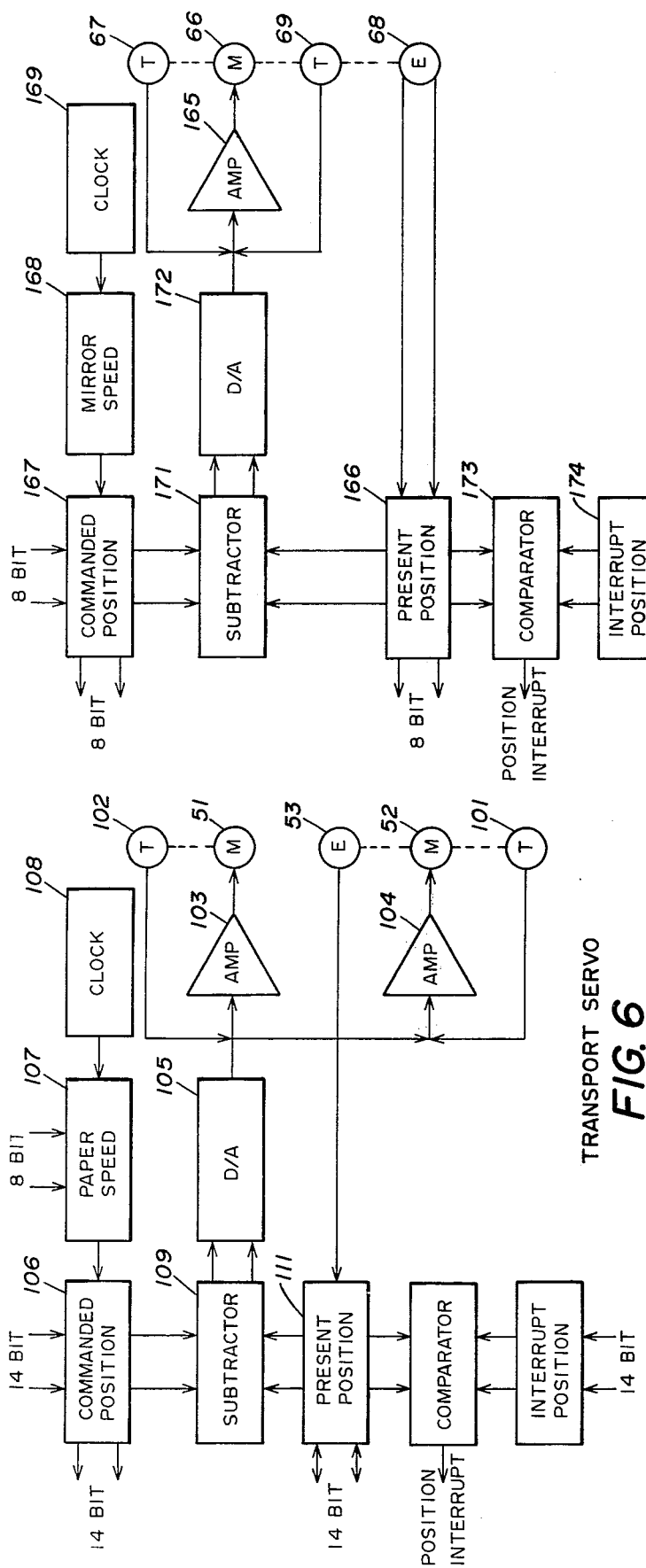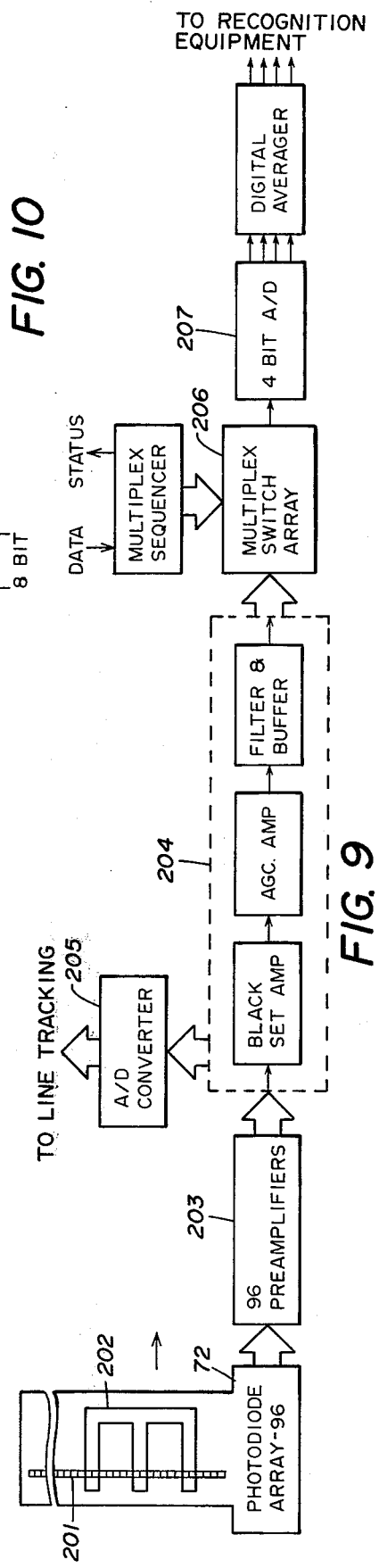

DOCUMENT TRANSPORT AND SCANNING SYSTEM FOR OPTICAL CHARACTER RECOGNITION

This is a continuation of application Ser. No. 166,736, filed July 28, 1971, now abandoned.

BACKGROUND OF THE INVENTION

1. Field of the Invention

The invention relates to optical character recognition systems, and more particularly, to an improved document transport and character scanner for an optical character recognition system.

2. History of the Prior Art

In prior art optical character recognition systems, a number of different techniques have been used for projecting an image of a character or line of characters to be recognized onto a matrix of photocells forming a retina. Such retinas are generally large, complex and expensive to maintain because of the optics required to project the image onto the retina and the probability of one or more individual photocells producing an improper response. The optical character recognition system of the present invention overcomes these disadvantages by employing a columnar retina including a plurality of photocells arranged in a single linear array across which images are scanned. The outputs from the individual photocells forming the columnar array are periodically sampled to produce electrical indicia from which a character is recognized.

The scanning systems of prior art optical character recognition systems have used cathode ray flying spot scanners, rotating lens systems and counter rotating prisms to scan the image of a character across a retina. Each of these devices, however, have inherent electrical and/or mechanical disadvantages due to their complexity as well as certain limitations due to the restrictions on scanning various document formats. Further problems have been encountered with using prior art systems to simultaneously sweep an illumination beam across a character array and scan the illuminated image while synchronously driving the transport system of the document being scanned. The invention employs scanning and transporting means which are held in synchronism and actuated by digitally controlled logic.

SUMMARY OF THE INVENTION

In accordance with the invention a synchronized document transport and scanner for an optical character recognition system includes a document support bed having a concave arcuate surface and a central channel. A document reading station on the support bed includes a scanning arc through which documents having characters thereon are transported. A plurality of guide pulleys are rotatably mounted within the bed channel. A document transport belt is journaled about the pulleys with its upper surface parallel to and lying slightly above the plane of the surface of said bed adjacent to the central channel. A shaft is mounted for rotation above the bed and extending in the direction of the linear path. An illumination mirror and an image mirror are mounted to the shaft. Both of the mirrors have a reflecting surface which is coplanar with the longitudinal axis of the shaft. A light source is also mounted upon the support to direct a beam of light upon the surface of the illumination mirror and reflect the beam to a point located upon the scanning arc on the bed plate.

The system includes a columnar photocell retina and optical means which projects upon the retina the image reflected by the image mirror of a character located at the illuminated point upon the scanning arc. A roller housing is supported above the bed and extends the length of the bed overlying the channel. A plurality of rollers are mounted within the housing and biased into engagement with the surface of a document supported by the bed to press the document into frictional engagement with the belt. During scanning the shaft is oscillated through a preselected arc to simultaneously illuminate and scan images of characters lying upon the scanning arc across the columnar retina. The belt is moved to transport documents along the surface of the bed through the scanning arc while simultaneously oscillating the shaft to scan the lines of characters on the document.

BRIEF DESCRIPTION OF THE DRAWING

FIG. 3 is a perspective view of the document transport of the present invention;

FIG. 4 is a perspective view of a part of the document transport of FIG. 3 illustrating the cover latching feature;

FIG. 6 is a block diagram of the control electronics for the document transport of the present invention;

FIG. 9 is a block diagram of the circuitry employed to process the data received from the retina of the document scanner of the present invention; and FIG. 10 is a block diagram of the control electronics for the scanning system of the present invention.

DETAILED DESCRIPTION

Figure 1:
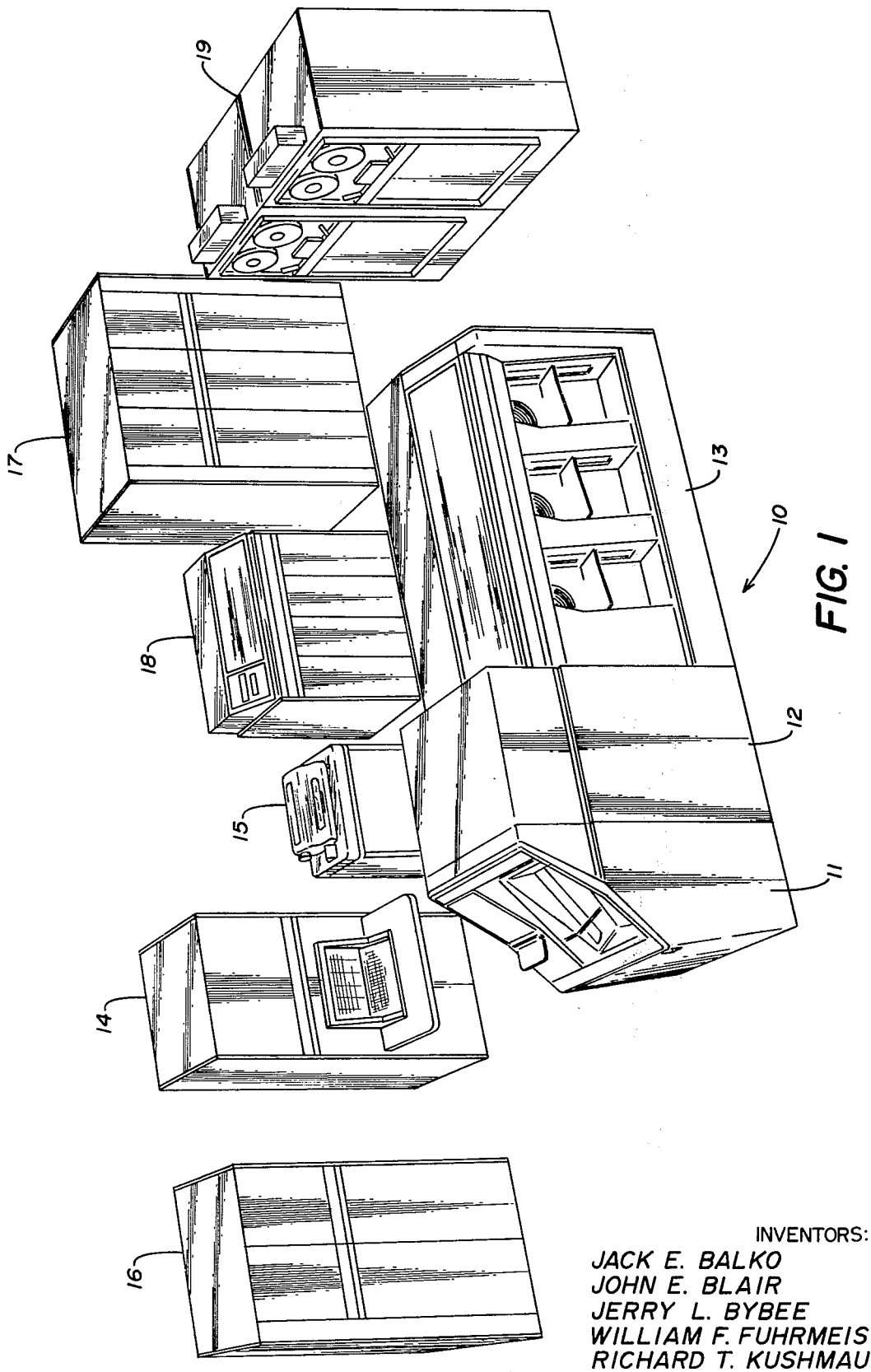
FIG. 1 is a layout of units of the system wherein the document transport and scanner of the present invention is embodied.

The present document transport and scanner system may be best understood by reference to its relation to a complete document reading system. Referring now to FIG. 1, a page processor 10 is employed for the feeding, scanning and stacking of documents. The page processor comprises a feeder unit 11, a transport and scanning unit 12, to which the present invention is directed, and a stacking unit 13. Peripheral equipment to the system comprises a control console 14, an I/O unit 15, a peripheral control unit 16, a recognition unit 17 which includes logic circuitry for the recognition of characters of fixed fonts as well as characters of handprint execution, a line printer 18 and a tape transport unit 19.

The system shown in FIG. 1 has the capability of accepting a range of document sizes up to 9 × 14 inch documents with single spaced full coverage of the document. The system is capable of reading and completely transferring to storage, to line printer 18 or tape transport 19 all of the information on such documents at rates of the order of about 30 pages per minute. On the other hand, credit card type documents, wherein the reading is to be accomplished on one or two lines only, can be processed by the present system at the rate of up to 300 cards per minute. The system operates by placing into a hopper in feeder 11 a stack of documents to be read, feeding the documents one at a time into the transport and scanning unit 12, and then delivering the documents to the stacking unit 13 wherein the stacking can be selectively dependent upon any coded information on the documents themselves.

In order to provide an understanding of the setting in which the present invention finds itself and the desirability for the unique capabilities of the document transport and scanner of the present invention, the line diagram of FIG. 2 will be described.

Figure 2:
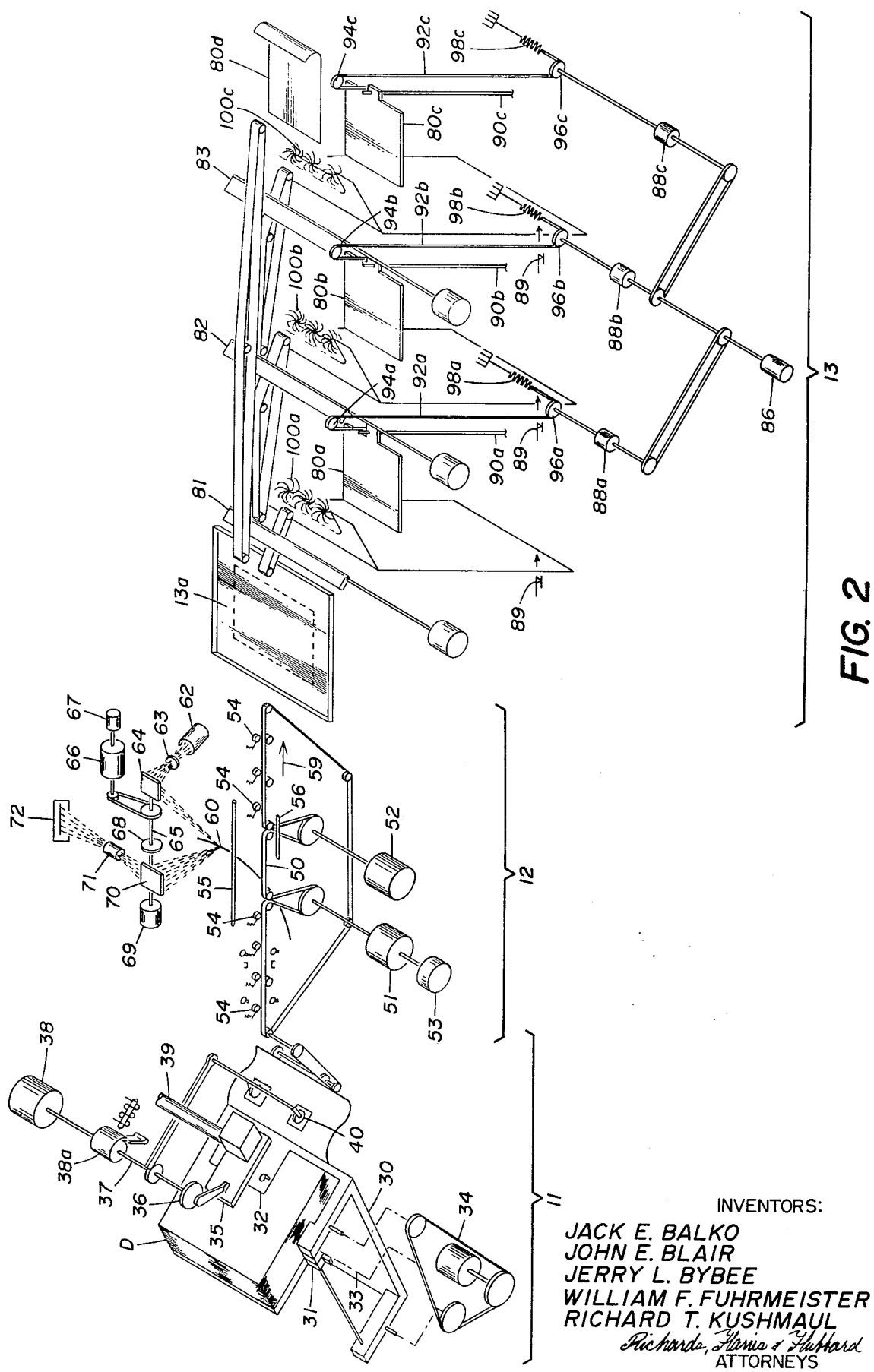
FIG. 2 is a diagrammatic representation of the mechanical portions of the page processor unit of FIG. 1.

Referring now to FIG. 2, a document feeder 11 has been illustrated as comprising a tray 30 in which a stack D of documents may be placed with the documents being oriented as to stand on the bottom edge thereof. A paddle 31 is slidably mounted to move the documents forward against a shuttleplate unit 32. The paddle 31 is linked mechanically as by linkage 33 to a chain 34 which is servo driven to maintain the documents in a given density in the region of the face of the shuttleplate unit 32. A shuttleplate 35 is reciprocated through a crank unit 36 on a shaft 37 driven by a feeder motor 38 through a single revolution clutch 38a. The shuttleplate 35 has a plurality of apertures formed through it. A vacuum is maintained in the apertures through a vacuum system connected to an exhaust pipe 39. By this means, individual documents are sequentially removed from the stack D and are moved downwardly into engagement with a set of pinch rollers that are diagrammatically represented at 40.

The pinch rollers 40 direct each document into the document transport scanning until 12 wherein the document is advanced by a belt 50 that is driven by a pair of servo motors 51 and 52 in response to a position encoder 53 and a suitable control system. Documents are maintained in contact with the belt 50 by a series of rollers 54 and guided by a pair of parallel tubes 55 and 56 positioned above and on opposite sides of the belt 50. In the region of arc 60, the documents are drawn into a fixed position against a bedplate by a plurality of vacuum ports (not shown) Arc 60 represents the scan location of documents traveling under the action of the belt 50, and the arow 59 represents the direction of travel of the documents.

At the scan location, light from a high intensity lamp 62 passes through a lens system 63 onto an oscillating mirror 64 and is projected and focused onto a scan point on arc 60. The mirror 64 is mounted on a shaft 65 that is driven by a servo motor 66, having a servo tachometer 67 associated therwith, and an encoder 68 and a tachometer 69 responsive to the movement of the shaft 65. A scanning mirror 70 is mounted on the shaft 65 for oscillation with the mirror 64. Light reflected from the mirror 70 passes through a lens system 71 onto a columnar retina 72. In one embodiment of the syste, the retina 72 is provided with 96 active cells and is operated such that characters viewed by the retina as the light beam sweeps arc 60 actually fall on or energize 16 cells for a normal character, i.e., a character of usual type print height. The remainder of the cells of the retina are employed in the system for locating the next line to be scanned and for providing control signals to the servo motors 51 and 52, whereby the document is properly positioned for the initiation of the scan of the next line.

Once scanned, each document is fed to a rest station 13a at the input of the stacker unit 13. The movement of the document is arrested at the rest staation to permit the stacker unit to resond to control instruction. Then in accordance with such control instructions, the document is delivered, either to a selected one of three bins 80a, 80b, and 80c, or to a reject bin 80d. The movement of documents in the stacker unit 13 is under the control of stacker gates 81, 82 and 83, and spiral stacking wheels are employed to deliver documents to the selectable bins 80a, 80b, and 80c.

In order to accommodate documents of different weights, a positive control is provided through a stacker motor 86 operating through clutches 88a, 88b, and 88c to maintain the top of the stack of the documents on each of the paddles 80a–c, respectively, in a predetermined relation to the periphery of the spiral stacking wheels. In each bin, the document level is sensed by photocells to control the respective clutches 88a–c.

Within this environment, the document stacker 13 of the present inventio is called upon to provide reliable feed and stacking of documents to the system in each of the many various conditions that may be prescribed by a user. The system of FIGS. 1 and 2 thus may operate in a wise variety of conditions and thys may be termed a universal document reader, being limited only by the maximum size of documents that can be accommodated in the document transport and stacking systems.

Photoelectric sensors 89, not shown, are disposed adjacent the paddles 80a–c and control the operation of the stacker motor 86. The paddles 80a–c are respectively slidably mounted upon shafts 90a–c and are moved along the shafts 90a–c by operation of suitable belts or chains 92a–c. Chains 92a–c are reaved over pulleys 94a–c and 96a–c. Each of the chains 92a–c is respectively coupled through negators spring 98a–c, with the end of each of the constant force springs being connected to a rigid frame. Operation of the stacker motor 86 may then move the chains 92a–c to move the paddles 80a–c vertically along the shafts 90a–c, in order to maintain the stack of documents thereon in a predetermined relationship to stacking wheels 100a–c. Wheels 100a–c serve to decelerate and stack documents fed from the rest station 13a. For further description of the control of deflecting blades for selective stacking of documents with a plurality of pockets, reference is made to U.S. Pat. No. 3,460,673, issued on Aug. 12, 1969, to the present assignee.

Within this environment, the document transport and scanner of the present invention is called upon to provide reliable transport of a document into a reading station, scanning of the document and transport to the stacker of documents fed to the system in each of the many various conditions that may be prescribed by a user. The system of FIGS. 1 and 2 thus may operate in a wide variety of conditions and thus may be termed a universal document reader, being limited only by the maximum size of documents that can be accommodated in the document transport and stacking systems.

PAPER TRANSPORT

In handling documents from which characters are to be optically recognized, a paper handling system must include means for acquiring documents from an input or a feeding station, moving the documents to an information retrieval station for optical scanning and for then releasing the scanned documents to a station for sorting and stacking. The manner in which documents are transported through the scanning station and supported during the scanning operation is critical to the proper operation of the system therefore the document transport must be very accurately controlled and driven during the scanning operation.

Figure 5:
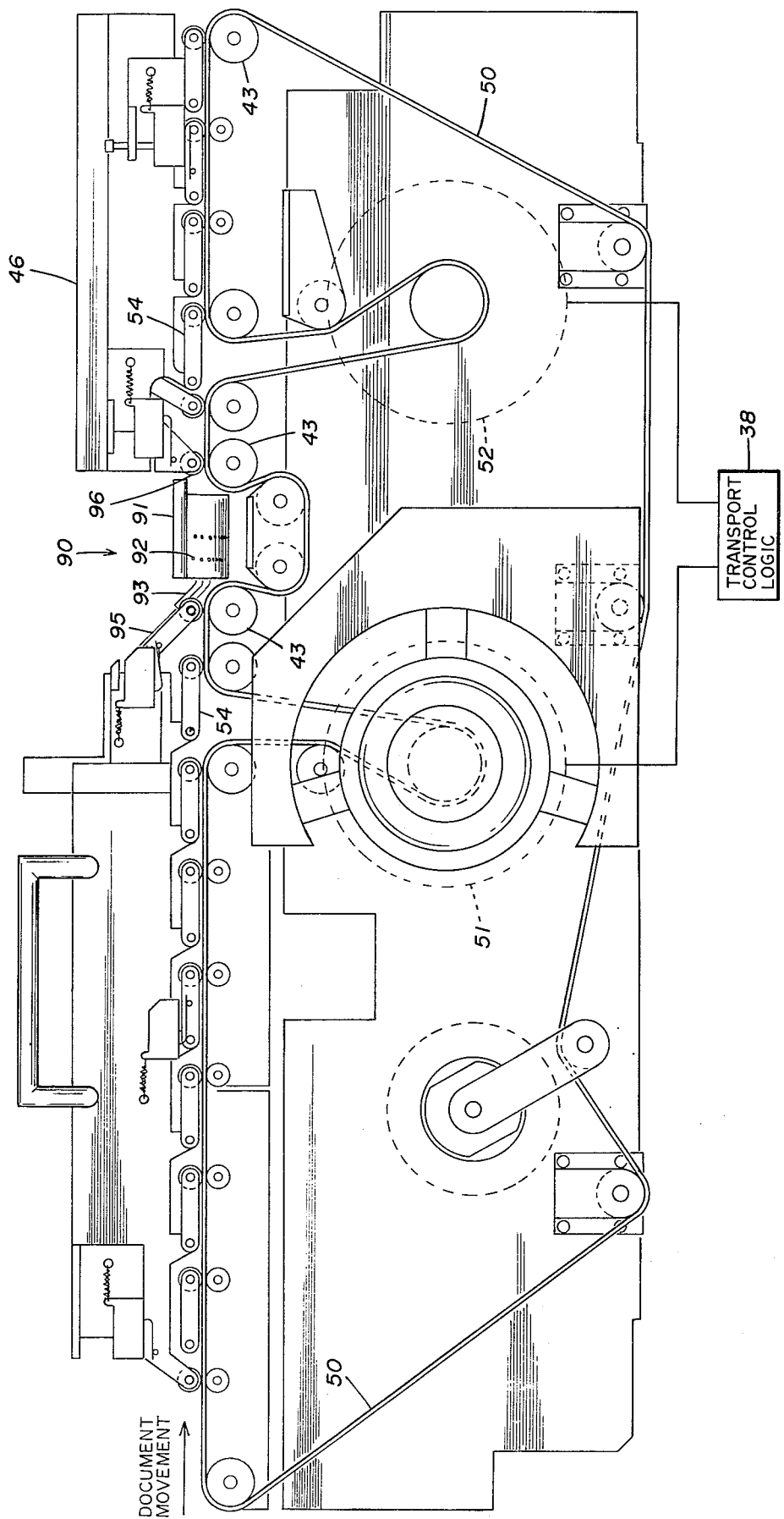
FIG. 5 is a side diagrammatic view of the document transport of the present invention.

Referring to FIGS. 3 and 5, the document transport of the invention includes a base frame 20 which extends in the direction of document movement and to which is attached an arcuate bed 41 having a plurality of longitudinal ribs 42 extending the length of the bed. A central channel extending the length of the bed 41 mounts a plurality of pulleys 43 which serve to support a single endless guide belt 50. The belt 50 extends along the channel in a plane slightly above that of the surface of the bed 41. A transport cover 44 is hinged to the base frame 20 and mounts a roller housing 46 along the front edge thereof. A plurality of rollers 54 are journaled within downwardly extending fingers 47 which are mounted to the housing 46 and are spring biased toward the transport belt 50 when the transport cover 44 is in the down position. A plurality of limit switches 48 are also mounted to the roller housing 46 so that in the event of a malfunction such as paper crumpling or doubling of sheets, the limit switches 48 trigger a microswitch to stop the transporting operation.

The transport cover 44 is spring biased toward an up position by a damper (not shown). The cover 44 is held in the downward or closed position by a latch member 80 and a mating catch 22, which are best shown in FIG. 4. The latch 80 includes a bar 81 which is attached to the roller housing 46 and which has a cut-out 82 to receive the pivotally mounted catch member 83. The catch 83 is pivoted into and out of engagement with the cut-out 82 by a solenoid (not shown). In the event of a malfunction, the solenoid is actuated in response to closure of the limit switches 46 to release the catch and allow the top cover to spring into the upper position and thereby stop the document transportation force by removing the roller pressure which holds the documents against the transport belt 50. When the cover is up, the damaged documents causing the malfunction can be easily removed.

Referring again to FIGS. 3 and 5, paper is delivered from a feeder mechanism to a set of pinch rollers (not shown) and from there passes between a first one of the rollers 54 which press the paper into frictional engagement with the drive belt 50. The paper is then carried by the belt along the arcuate surface of the bed 41 and is supported by the longitudinally extending ribs 42. Documents pass into the area of the optical reading station 90 upon which lies the scanning arc 60. While in the scanning station 90, the paper is held against a perforated bedplate 91 by a suction force applied from a vacuum source through a plurality of apertures 92 in the plate 91. The paper is guided into the scanning station 90 by a plurality of finger like shovel guides 93 which are mounted to a downwardly extending support 94 by a plurality of arms 95.

As a document D passes through the read station 90, the characters lying along the scanning arc 60 are scanned by the optical scanning system described below. After passage through the character reading station 90, documents travel under a guide arm 96 and thence under a continuation of the rollers 54 which again press the paper into frictional engagement with the belt 50. The paper passes from the transport assembly out to a paper stacking operation. The rollers 54 are so spaced from one another that there are always at least two in contact at all times with the smallest size document to be transported to prevent skew. As best shown in FIG. 5, the belt 50 is looped around the guide pulleys 43 to extend beneath the document scanning station 90. The belt 50 is moved along the central channel by a pair of drive pulleys 96 and 97 which are rotated in response to a pair of servo motors 51 and 52 operated under control of a logic system 98.

Referring now to FIG. 6 the transport belt servo motor 51 is fixed to a shaft with a tachometer 101 and a rotary position encoder 53 while motor 52 is fixed to a shaft with a tachometer 102. The transport control logic system 38 (FIG. 5) includes identical servo amplifiers 103 and 104 which drive the motors 51 and 52 respectively. Both of the amplifiers 103 and 104 are connected in parallel to be actuated by a single digital-/analog converter 105. The servo motors 51 and 52 are operated by a control computer system (not shown) which supplies a 14 bit digital signal to a commanded position register 106 and an 8 bit digital signal to a paper speed control unit 107 which is driven by a clock 108. The 8 bit digital word is indicative of the speed with which it is desired to move the paper through the paper transport and may range from zero to 15 inches per second. The digital speed control word stored in the unit 107 regulates a frequency division multiplication of the impulses from the clock 108. The unit 107 then supplies a preselected frequency of input pulses to the commanded position register 106.

The output of the commanded position register is connected to one input of a digital subtractor 109 which in turn drives the digital/analog converter 105. The position encoder 53, which is attached on the same shaft with the motor 51, has its output connected to a present position register 111. The output of the present position register is connected to the other input of the subtractor 109 so that the difference between the commanded position register reading and the present position register reading is used to drive the digital/analog converter 105. Thus, the error signal from the subtractor 109 powers the servo motors 51 and 52 through the amplifiers 103 and 104 to rotate toward the commanded position.

An interrupt position control unit 112 is used to control the functions of the transport servo system when the transport reaches a preselected position. Information fed into the interrupt register 112 is compared with the information contained within the present position register 111 by a digital comparator 113. When the information is identical, the comparator 113 produces a position interrupt output signal for the control computer. In response to the interrupt signal the computer delivers the information required to change the paper speed control register 107 and the digital word stored within the commanded position register 106. Thus, it is not necessary to step through the entire length of the document having a certain character format if certain information is not present or if the page is only partially filled with characters to be read.

One of the principal functions of the paper speed control unit 107 is to regulate the speed of the transport so as to compensate for skew in the document being read. When a document first passes beneath the scanning system discussed below, the leading edge of the document is scanned and the information transmitted to the control computer. The amount of skew of the document is calculated by the computer which then loads the paper speed control unit with the proper digital word to regulate the speed of the transport as it moves the paper under the scanning system to compensate for the skew.

SCANNER SYSTEM

Figure 7:
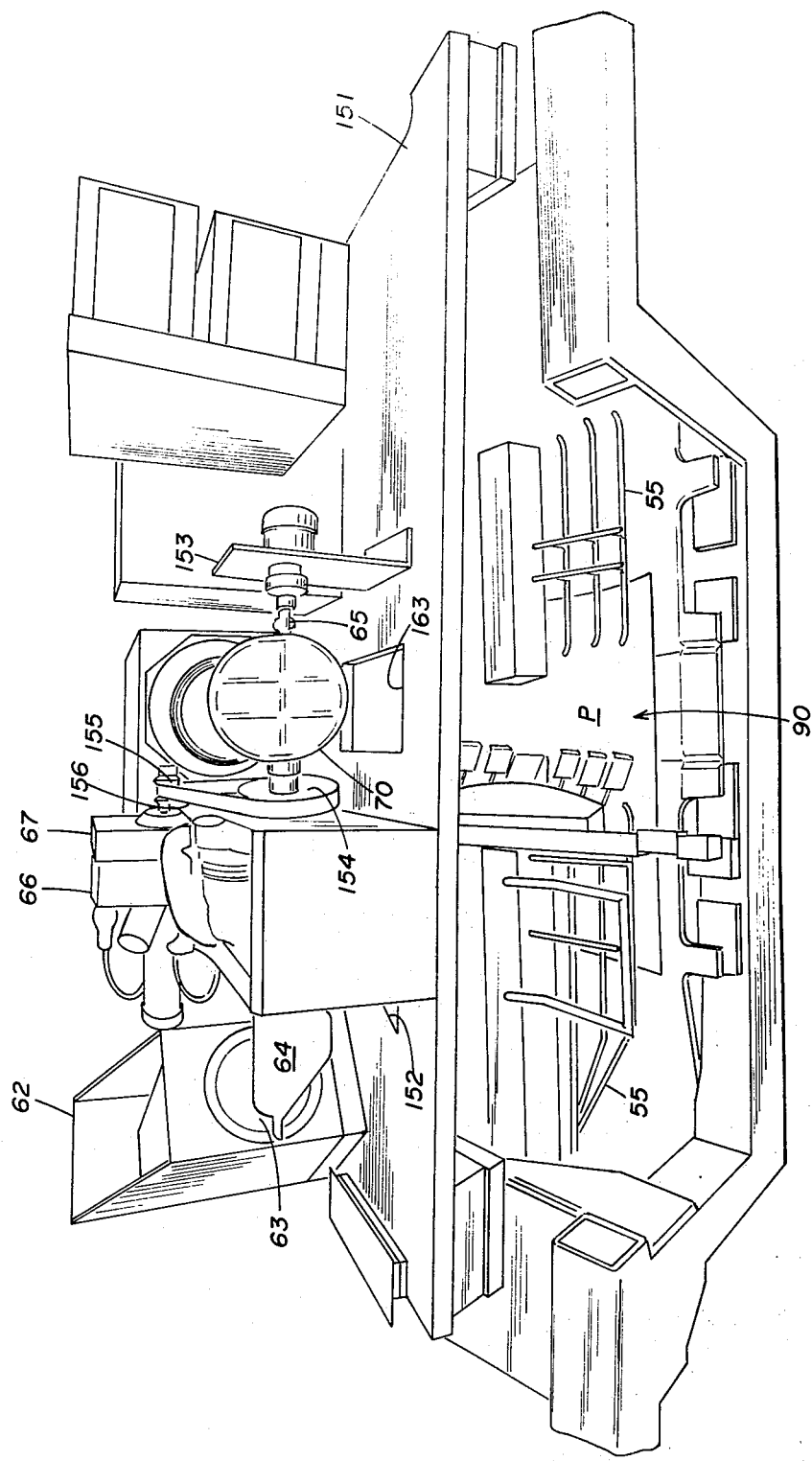
FIG. 7 is a perspectivie view of the document scanner of the present invention.
Figure 8:
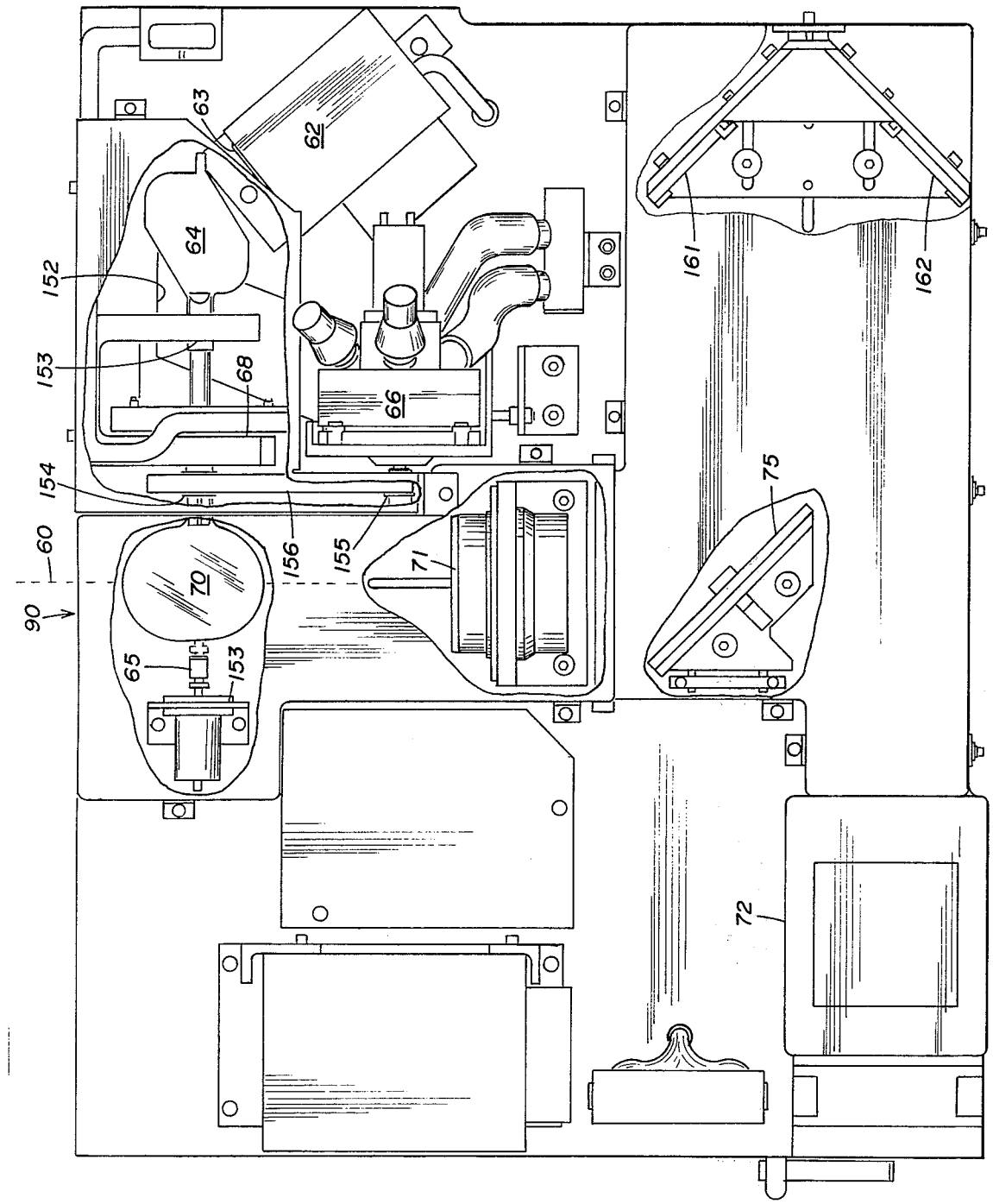
FIG. 8 is a top view of the document scanner of the present invention.

Referring now to FIGS. 7 and 8, the scanner of the present invention is mounted above the document transport system of FIGS. 3 and 5. The equipment is mounted upon a platform 151 which lies above and at an angle to the plane of the transport bed 41. The platform has a first opening 152 to permit the passage of illumination from the scanner onto the document being read and a second opening 153 to allow illuminated character images to be scanned. The scanner includes a central shaft 65 rotatably mounted by a plurality of arms 153 which are supported upon the platform 151. An illumination mirror 70 is fixed to one end of the shaft 65 while an image scanning mirror 64 is fixed to the other end. The reflecting surfaces of the mirrors 64 and 70 lie in the same plane as the axis of the shaft 65 so that as the shaft is rotated, the distance from the characters on the documents to the mirror and the focal length of the optical system remains constant. A pulley 154 is also mounted to the shaft 65 and is connected to a 4:1 reduction pulley 155 by a drive belt 156. The smaller pulley 155 is attached to the driving shaft of a servo motor 66 which also has a tachometer 67 fixed to its shaft. A position encoder 68 is fixed to the shaft 65 so that at any given instant of time an indication is given as to the precise angular position of the shaft. The encoder 68 consists of a circular plate having a coded array of holes formed therein and an optical system for delivering a GRAY code output indicative of the orientation of the holes with respect to the optical system. A second tachometer 69 is mounted to the shaft 65 to indicate the angular velocity with which the mirrors are moving at a given instant of time.

A lamp 62 is mounted adjacent the illuminating mirror 70 and is arranged to project a beam of light through an anamorphic lens 63 onto the surface of the mirror 64. The mirror 64 reflects the beam through opening 152 in the platform 151 onto the surface of the document in the scanning arc 60 in the scanning station 90. The anamorphic lens 63 shapes the beam of light so that a somewhat oblong column of light extends in the direction of paper movement to overlie several lines of print and illuminate a plurality of lines of characters along the scanning arc 60 on the surface of the document being read.

The image mirror 70 is oriented on the shaft 61 so that an image of the character area being illuminated by the mirror 64 is projected through an objective lens system 71 onto a series of fixed mirrors 75, 161 and 162 and then onto a columnar retina 72. The optical path 163 from the image mirror 70 to the retina 72 is, in one embodiment of the invention, arranged to be twice the distance from the lens 71 to the character on the document being scanned.

Referring to FIG. 9, the retina 72 comprises a single columnar array 201 of 96 photocells across which an image 202 of successive characters lying along the scanning arc 60 is projected by the image mirror 64 and the optical system of the scanner. Retina 201 is a linear monolythic array of silicon photodiodes consisting of 96 elements placed on a column. In one embodiment, each element has an active area on the order of 0.014 inches wide by 0.012 inches high. The elements were spaced from one another a distance on the order of 0.014 inches center to center.

When an image 202 of a character to be recognized is passed across the column of photocells 201, a portion of the character height extends in a direction from top to bottom of the columnar array and exposes only a fraction of the number of cells in the array. The outputs of the cells in the array are scanned from bottom to top at such a rate that a vertical section of a character of 0.007 inches wide is sampled three times before it completes its traverse across the array. Obviously, a character having a nominal height of 0.112 inches will only cover half the number of photocells as the same character having a height of 0.224 inches. With the data gathered from the smaller character by scanning the photocell outputs different from the data gathered from a larger identical character, normalization is provided so that identical sets of data are ultimately produced for different sizes of a character, before being output to a recognition unit.

As afore noted, the photodiodes in the retina 201 are individually connected to 96 preamplifiers 203. The preamplifiers 203 are used to provide current gain for the photocell outputs and act as high impedance current sources for a system of video amplifiers 204.

The video amplifiers 204 connect the amplified photocell currents from the retina preamplifiers to analog voltage signals that vary from 0 to 5 volts. Automatic gain control is used to set the gain of the amplifiers 204 such that the highest output of each photocell in the array is transformed to 5 volts at each amplifier output when a given photocell views a white area. Thus the retina amplifiers 204 equalize background levels and help make the characters stand out on a white background. A black level set unit is provided to null the lowest light level current from the photocells to a zero (0) volt output. The retina amplifiers 204 provide a digital output for use by line tracking circuitry.

The individual amplified output from each one of the 96 photocell elements of the columnar retina are also digitized by a differential comparator 205; a video analog voltage greater than 3.5 volts represents a white logic level and a voltage less than 3.5 volts represents a black logic level. The digital levels are connected to line tracking circuitry which monitors the photocells being stimulated by a character and transmits the information to the process controller which controls the window position being scanned by the multiplexer 206.

As shown in FIG. 9, the amplified output of each of the photocell elements of the columnar retina 201 passes into a multiplex switch array 206. The function of the multiplexer is to sample the amplified analog voltages from the columnar photocell array and produce a serial stream of data corresponding to a vertical scan through the character space. The sample period of the multiplex switches is set to obtain 36 scans per character when reading at 300 document in/sec. Three character heights are sampled to allow for skew and character misreigistration. The number of vertical samples will vary from 48 for a nominal 0.112 inch character to 96 for a 2:1 0.224 inch character. However, the data output will always be related to a 48 equivalent cell window height and a 16 cell character height.

Analog data is clocked into an analog/digital converter 207 at the multiplex clock rater under control of a multiplex sequencer 208. Holding circuitry is not required because the sample times are so small. The analog/digital converter 207 which converts each one of the analog voltage levels from the respective photodiode outputs to a four bit digital representation of that level. A completely black cell is represented by the digital word 0000 while a completely white cell is represented by the digital word 1111. The digital signals are then coupled to the input of a digital averager for further processing.

The four bit digital words representing cell values are then input to a digital averager 209 in which they are normalized into a single format of data regardless of the character size being scanned. The normalized data is output to a recognition unit for character identification.

In operation, a document having lines of characters thereon which are to be scanned passes through the transport system into the scanning station 90. The motor 66 is alternately driven in opposite directions so that the shaft 65 is oscillated through a preselected arc at a predetermined rate. Oscillation scans the illumination beam perpendicular to the direction of document motion along the lines of print which are to be read. At the same time, an image of the characters being illuminated is projected via the mirrors 70, 75, 161 and 162 and is scanned across the columnar retina 72. The photocell outputs are scanned and sampled by the electronic system, shown in FIG. 8, and described above to encode character information to be recognized.

Angular velocity information related to the motor 66 is transmitted to a system of control electronics 78 by the motor tachometer 67 while velocity information related to shaft 65 is transmitted to the scanner control logic, shown in FIG. 9, by the minor tachometer 69. Information related to the instantaneous angular position of the shaft 65 is transmitted to the control logic by the position encoder 68. The scanner control logic circuitry accepts digital inputs from the two tachometers and the rotary position encoder and continuously drives the servo motor 66 so that the mirror scanning system will be moved at the proper rate and through the desired positions on the lines of characters to be recognized. The scanner control logic and the document transport logic, shown in FIG. 6, are both actuated by the process control computer.

Referring now to the scanner control logic of FIG. 10, the mirror motor 66 is driven by a servo amplifier 165 which is connected in a feed back loop along with the output of both of the motor tachometer 67 and mirror tachometer 69. The output of the position encoder 68 is connected to the input of a present position register to store an 8 bit digital word representative of the GRAY code instantaneous position output signal from the encoder. The control computer delivers an 8 bit digital word to a commanded position register 167 which is also connected to a mirror speed control register 168 which is in turn operated under the control of a clock 169. No arrangements are included for varying the constant mirror speed register 168 since the mirror is to continually sweep through the scanning arc at a constant rate on the order of 300 in/sec and then retrace at a faster time of 0.020 seconds.

The output of the commanded position register 167 is connected to one input of a subtractor 171 while the output of the present position register is connected to the other input. The difference in the two signals is fed as an error signal to a digital/analog converter 172 the output of which is used to drive the servo amplifier 165.

Provision is made for interrupting the norml scanning routine when the annular position of the shaft reaches a preselected value. A signal is transmitted to the control computer from a comparator 173 which indicates that the information in the present position register 166 corresponds to the information stored in an interrupt position register 174 previously loaded by the computer. This interrupt feature enables the scanning system to retract from a preselected angular position under control of the computer.

The document feeder and its operation are described and claimed in co-pending application, Ser. No. 159,141 filed July 2, 1971, by Alton H. Mayer and William C. Monday, and assigned to the assignee of the present invention.

The document stacker and its operation are described and claimed in co-pending application, Ser. No. 159,216 filed July 2, 1971, by William C. Monday, and assigned to the assignee of the present invention.

The normalizer and its operation are described and claimed in co-pending applicaton, Ser. No. 166,811 filed July 28, 1971, by Dale DuVall and Chester Borowski, and assigned to the assignee of the present invention.

The recognition unit and its operation are described and claimed in co-pending application, Ser. No. 166,802 filed July 28, 1971, by William A. Hale and Larry P. Flaherty, and assigned to the assignee of the present invention.

Having described the invention in connection with certain specific embodiments thereof, it is to be understood that further modifications may now suggest themselves to those skilled in the art and it is intended to cover such modifications as fall within the scope of the appended claims.

What is claimed is:

1. In an optical character recognition system a document scanner comprising:
   an illumination mirror and an image mirror fixed to a common shaft mounted for rotation about its axis;
   a source of light directed onto said illumination mirror for reflection onto a document to be read;
   a columnar retina for receiving character images reflected from said image mirror;
   means for rotating said shaft about its axis to simultaneously scan a light beam across characters on said document and scan an image of the illuminated characters across said columnar retina;
   means responsive to the angular position of said shaft for storing a digital signal representative of the present position;
   means for storing a second digital signal representative of the commanded position to which it is desired to rotate said shaft;
   means for comparing said first and second digital signals to produce a digital error signal indicative of the difference therebetween; and
   means responsive to said digital error signal for producing an analog voltage for energizing said means for rotating said shaft to move the shaft toward the commanded position.

2. A document scanner as set forth in claim 1 which also includes:
   means for amplifying each of the individual outputs from the photocells of said retina;
   means for constraining the amplified signals within a preselected voltage range;
   means sequentially sampling the constrained voltage signals to form a train of data;

means for digitizing the voltage signals forming said train; and means for normalizing the train of digital data into a preselected format to be introduced to a recognition unit for analysis.

3. A document transport as set forth in claim 1 which also includes means for storing a third digital signal representative of a position of said shaft at which it is desired to interrupt the routine of said means for rotating said shaft;

means for comparing said first digital signal with said third digital and producing a position interrupt signal to change the routine of said means for rotating said shaft.

4. In an optical character recognition system;

a document support bed having a concave arcuate surface, a central channel extending its length, and a document reading station including structure forming a scanning arc through which documents having characters thereon are to be transported along a linear path;

a plurality of guide pulleys rotatably mounted within said channel;

a document transport belt journaled about said pulleys to have its upper surface parallel to and lying slightly above the plane of the surface of said bed adjacent said central channel;

a shaft mounted for rotation about an axis above said bed and extending in the direction of said linear path;

an illumination mirror and an image mirror mounted on said shaft, both of said mirrors having a reflection plane lying upon the longitudinal axis of said shaft;

a light source mounted upon said structure and positioned to direct a beam of light onto the surface of said illumination mirror and reflect the beam to a point located upon said scanning arc on said bed;

a columnar photocell retina positioned to receive the image reflected by said image mirror of a character located at the illuminated point upon said scanning arc;

a roller housing supported above said bed and extending the length of said bed overlying said channel;

a plurality of rollers mounted within said housing; said rollers being biased into engagement with the surface of a document supported by said bed to press said document into frictional engagement with said belt;

means for oscillating said shaft through a preselected arc to simultaneously illuminate the scan images of characters lying upon said scanning arc across said columnar retina; and means for moving said belt to transport said document along the surface of said bed through said scanning arc while simultaneously oscillating said shaft to scan the lines of characters on said document.

5. In an optical character recognition system as set forth in claim 1, including:

electrical means for driving said means for moving;

means responsive to the position of said means for moving for storing a first digital signal representative of the present position;

means for storing a second digital signal representative of a commanded position to which a document is to be transported by said means for moving;

means for comparing said first and second digital signals to produce a digital error signal indicative of the difference therebetween; and means responsive to said digital error signal for producing an analog voltage for energizing said means for moving to move the document toward the commanded position.

6. A document transport as set forth in claim 5 which also includes means connected to said means for storing the second digital signal for changing said second signal at a variable rate to control the speed at which a document is transported by said moving means.

7. In an optical character recognition system having a reading station, comprising in combination:

a document bed having a concave arcuate support surface with the arc transverse of the length of said bed to form a scanning arc, and a central channel extending the length thereof in the direction of movement of a document along said bed;

a plurality of drive pulleys rotatably mounted within said channel;

a document transport belt engaging said pulleys and having an upper surface generally parallel to and aligned slightly above the plane of the surface of said bed adjacent said central channel;

a roller housing which extends the length of said bed and lies above said channel;

a plurality of rollers mounted within said housing;

means to urge said rollers into engagement with the surface of a document supported by said bed and press the document into frictional engagement with said belt;

means for moving said belt to transport the document along the surface of said bed to the reading station;

means mounted at the reading station to generate a light beam to a point located upon the scanning arc;

a columnar photocell retina; and optical means mounted at the reading station and positioned to project upon said retina from the document a reflected image of a character located at the illumination point upon the scanning arc.

8. In an optical character recognition system as set forth in claim 7 which also includes a plurality of shovel guides mounted to said roller housing and extending down adjacent to but spaced from the surface of said bed to guide documents into said reading station.

9. In an optical character recognition system as set forth in claim 7 wherein said document reading station intermediate the ends of said bed includes:

an arcuate bed plate having a plurality of apertures formed therein for supporting a document during a scanning operation, said bed plate receiving a document from said bed before scanning operation and positioned to return a scanned document to said bed; and means for producing a reduced pressure within the apertures in said plate to draw a document against said plate and hold said document in a controlled plane during scanning.

10. In an optical character recognition system as set forth in claim 9 wherein the distance between the rollers nearest opposite edges of said bed plate is less than the length of the smallest document to be transported.

11. In an optical character recognition system as set forth in claim 9 wherein said central channel is interrupted by said bed plate and wherein said endless belt passes beneath the surface of said bed plate.

12. In an optical recognition system as set forth in claim 7 including a plurality of longitudinal ribs extending the length of said document bed in a direction of movement of a document along said bed.

13. In an optical character recognition system as set forth in claim 7 wherein said means mounted at the reading station includes:
- a shaft mounted for rotation about an axis above said document bed and extending in a direction of said central channel;
- an illumination mirror mounted on said shaft and having a reflection plane lying upon a longitudinal axis of said shaft; and
- a light source mounted above said document bed and positioned to direct a beam of light onto the surface of said illumination mirror and reflect the beam to the point located upon the scanning arc.

14. In an optical character recognition system as set forth in claim 13 wherein said optical means includes an image mirror mounted on said shaft and having a reflection plane lying upon the longitudinal axis of said shaft to reflect light from a character located at the illumination point upon the scanning arc.

15. In an optical character recognition system as set forth in claim 14 including means for oscillating said shaft through a preselected arc to simultaneously illuminate and scan images of characters lying upon the scanning arc across said columnar photocell retina.

* * * * *